W. L. FRAZER.
PNEUMATIC TUBE STEM DUST CAP.
APPLICATION FILED OCT. 4, 1915.

1,253,806.

Patented Jan. 15, 1918.

INVENTOR
WALTER L. FRAZER by A. B. Bowman
Attorney

UNITED STATES PATENT OFFICE.

WALTER L. FRAZER, OF SAN DIEGO, CALIFORNIA.

PNEUMATIC-TUBE-STEM DUST-CAP.

1,253,806.  Specification of Letters Patent.  Patented Jan. 15, 1918.

Application filed October 4, 1915. Serial No. 53,875.

*To all whom it may concern:*

Be it known that I, WALTER L. FRAZER, a citizen of the United States, residing at San Diego, in the county of San Diego and State of California, have invented certain new and useful Improvements in Pneumatic-Tube-Stem Dust-Caps, of which the following is a specification.

My invention relates to dust caps for use on the ordinary valve stem for pneumatic tubes and the objects of my invention are, first, to provide a dust cap which combines a cap for making the top end of the valve stem tight with a cap for preventing dust getting in around the valve stem; second, to provide a cap of this kind which is simple and economical of construction, durable, easy of application and does not readily get out of order; third, to provide a dust cap which only requires a few turns to make it dust tight and the top end of the valve stem air tight; fourth, to provide a combination dust cap for valve stems with an air cap and wrench for removing the ordinary or conventional air valve, and fifth, to provide a dust cap of this class which is applicable to the ordinary or conventional valve stem now in use.

Figure 1:
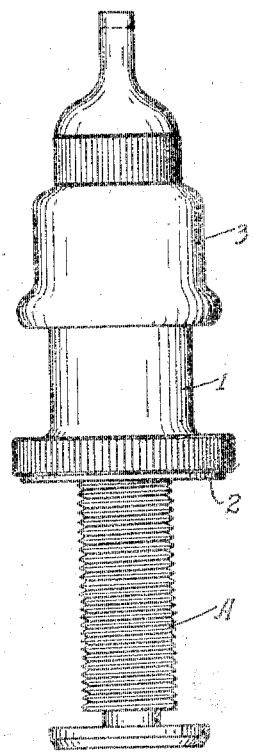
Figure 2:
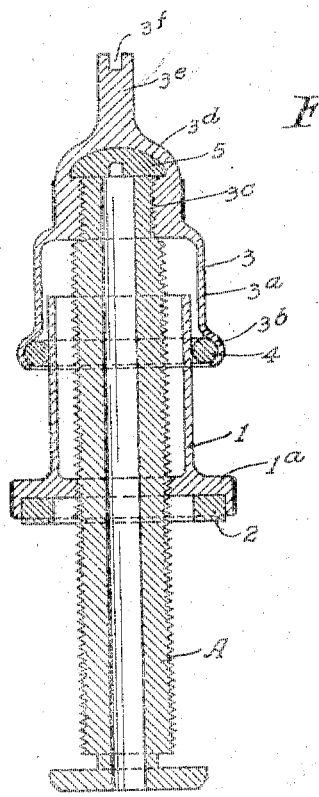

With these and other objects in view as will appear hereinafter, my invention consists of certain novel features of construction, combination and arrangement of parts as will be hereinafter described in detail and particularly set forth in the appended claim, reference being had to the accompanying drawings and to the characters of reference thereon which form a part of this specification, in which:

Figure 1 is a side elevational view of a valve stem showing my dust cap mounted thereon; and Fig. 2 is a sectional view thereof at a right angle to that of Fig. 1.

Similar characters of reference refer to similar parts throughout the views.

The sleeve piece 1, gasket 2, cap piece 3, gasket 4 and gasket 5 constitute the principal parts of my dust cap.

The valve stem A is of the ordinary or conventional type. Mounted thereon, by means of threads adapted to the threads on the stem, is the sleeve piece 1 which is provided with a flanged portion 1$^a$ on the lower side and in the lower side of said flange portion is provided an annular recess which is adapted for, and in which is mounted, the gasket 2 which is preferably a leather gasket of the class now in ordinary use. The sleeve portion of the sleeve piece 1 is spaced apart from the stem so as to give sufficient clearance between the stem and the inner surface of said sleeve portion. The cap 3 is provided with an enlarged portion 3$^a$ which is provided in its lower end with an annular recess portion 3$^b$ adapted for an elastic gasket 4 which is preferably soft rubber, the inner surface of which fits tightly over the sleeve part 1. In the reduced portion of said cap is provided a thread 3$^c$ adapted for the threads on the reduced portion of the ordinary or conventional valve stem. Immediately above this threaded portion is a pocket 3$^d$ adapted for the gasket 5. This gasket 5 is elastic, preferably soft rubber, for the purpose of making an air tight fit between the upper end of the valve stem and said cap. On the upper end of said cap 3 is provided a reduced portion 3$^e$ which is provided in its upper end with a slot 3$^f$ adapted for fitting and turning the ordinary or conventional air valve.

Though I have shown and described a particular construction, combination and arrangement of parts, I do not wish to be limited to this particular construction, combination and arrangement but desire to include in the purview of my invention the construction, combination and arrangement substantially as set forth in the appended claim.

It is obvious that with this construction, there is provided a dust cap for air valve stems for pneumatic tubes which combines the dust cap and air cap; that the device is simple and economical of construction, durable, easily applied and will not readily get out of order; that the dust cap requires but a few turns to make it dust proof; that the gasket 4, being squeezed onto the sleeve 1, will provide a tight fit between the cap piece 3 and said sleeve piece 1; that the sleeve portion of the sleeve piece 1 may be shortened or lengthened to suit different length valve stems and different makes of wheel rims.

Having thus described my invention, what I claim as new and desire to secure by Letters Patent, is:

In a pneumatic tube stem dust cap, the combination of a pneumatic tube stem threaded externally, a sleeve member threaded internally adapted to screw onto said valve stem, a cap adapted to fit loosely over said sleeve provided with a recess near its lower edge and threaded internally near its top end adapted to screw onto the upper end of said pneumatic tube stem, a gasket mounted in said recess adapted to fit tightly over said sleeve whereby a seal is effected between said cap and said sleeve, and said cap is separately removable from said stem and sleeve.

In testimony whereof, I have hereunto set my hand, at San Diego, California, this 27th day of September, 1915.

WALTER L. FRAZER.